F. M. SETTLE.
ROAD LEVELER.
APPLICATION FILED MAR. 4, 1914.
1,153,452.
Patented Sept. 14, 1915.
2 SHEETS—SHEET 2.
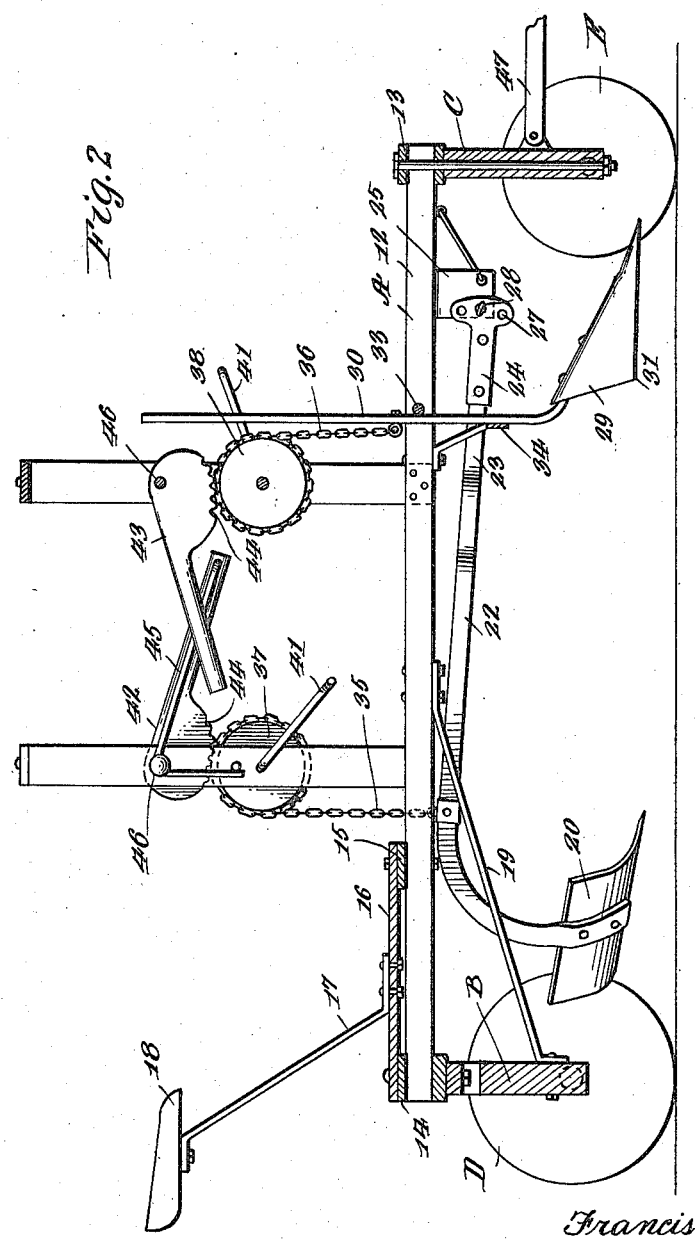

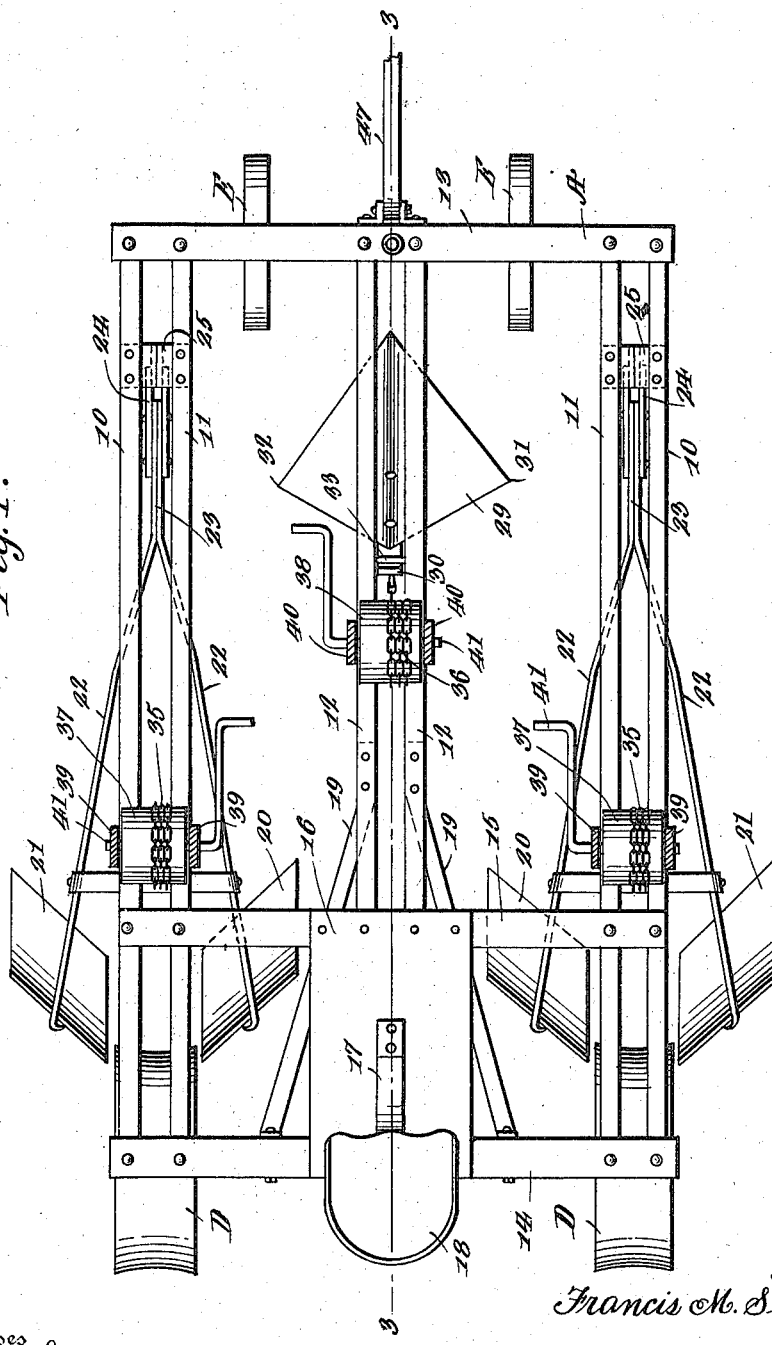

UNITED STATES PATENT OFFICE.

FRANCIS M. SETTLE, OF WYNNE WOOD, OKLAHOMA.

ROAD-LEVELER.

1,153,452.　　　　Specification of Letters Patent.　　Patented Sept. 14, 1915.

Application filed March 4, 1914. Serial No. 822,384.

*To all whom it may concern:*

Be it known that I, FRANCIS M. SETTLE, a citizen of the United States, residing at Wynne Wood, in the county of Garvin and State of Oklahoma, have invented certain new and useful Improvements in Road-Levelers, of which the following is a specification.

This invention relates to a road leveler, and the principal object of the invention is to provide a leveling machine which includes vertically adjustable scrapers for removing surplus dirt from the center of the road and scraping the same in the ruts formed by the wagon wheels, and to also provide rollers for packing the dirt into the wheel ruts.

Another object of the invention is to provide improved means for holding the scrapers in an adjusted position, this holding means being so mounted that the scrapers may be quickly moved from a raised to a lowered position.

Another object of the invention is to so construct the packing rollers that the dirt scraped into the ruts will be very tightly compressed and prevented from spreading out of the rut while being compressed.

Another object of the invention is to so mount the beams of the rear scrapers that they may be removably connected with the frame of the machine.

Another object of the invention is to so construct the rear scrapers that they will conform to the natural curvature of the road thus preventing the rear scrapers from digging into the road bed and forming furrows.

This invention is illustrated in the accompanying drawings wherein—

Figure 1 is a top plan view of the leveling machine. Fig. 2 is a section taken along the line 3—3 of Fig. 1.

The machine shown in Figs. 1 and 2 comprises a frame denoted in general by the letter A which is provided with the rear truck B and forward truck C which carry the rollers D and forward supporting wheels E. The side bars 10 and 11 and central bars 12 are connected by the forward and rear transversely extending bars 13 and 14 and by the intermediate transversely extending bar 15. The bars 14 and 15 carry the frame 16 which forms a foot-rest for the driver and also forms a platform to which the supporting arms 17 of the driver's seat 18 is secured. Diagonal braces 19 lead from the bars 12 to the rear truck B and brace the rear truck so that it will have no pivotal movement.

The rear scrapers are each provided with an inner and outer blade 20 and 21 which are carried by the beams 22. These beams 22 resemble plow beams and have their forward end portions 23 brought together and secured in the clevises 24 by suitable means such as rivets or bolts. These clevises 24 are adjustably and removably connected with the hanger brackets 25 which are carried by the side bars 10 and 11 and braced against rearward strain by means of the links or rods 26. In order to adjustably mount the clevises the front ends of the clevises have been provided with a plurality of openings 27 which are placed one above the other so that a selected set of the openings 27 may be placed in alinement with an opening formed in the hanger brackets with which the clevis is connected and a securing pin 28 passed through the alined openings of the clevis and hanger bracket. It should be noted that the upper and lower edges of the scraper blades 20 and 21 are cut diagonally so that when the scraper is in use, the dirt engaged by these blades will be moved toward the wheel ruts in the road and in front of the rollers D. The rollers D have concave edges so that when the rollers pass over the dirt which has been moved into the ruts, the dirt will be tightly compacted and pressed toward the center of the rut instead of being forced out of the rut.

The forward scraping blade which resembles a cultivator blade is secured to the lower end portion of the supporting bar or standard 30 and is of such width from the point 31 to the point 32 that the dirt scraped from the central portion of the road will be engaged by the inner scraping blades 20 of the rear scrapers. The standard 30 passes between the bars 12 and is engaged by the roller 33 and guiding bracket 34 so that it will move vertically without forward or pivotal movement. There is therefore no danger of the standard moving out of the vertical position and thus changing the incline of the scraping blade 29 so that its ground-engaging edges do not rest upon the road.

The forward and rear scrapers are engaged by chains 35 and 36 which are wound upon the drums 37 and 38. These drums are rotatably supported between the standards 39 and 40 upon the cranks 41. Clutch levers 42 and 43 are pivotally mounted above the drums 37 and 38 and are provided with teeth 44 which engage the chains upon the drums and prevent the drums from rotating when the clutch levers are in an operative position. In order to yieldably hold these clutch levers in an operative position each of the levers is engaged by a spring 45 carried by the bolt 46 which pivotally mounts the clutch lever.

The operation of this form of machine is as follows: The draft animals are connected with the tongue 47 and the machine is drawn along the road with the forward and rear scrapers in the raised position until a portion of the road is reached which needs to be level. The levers are now moved to release the chains 35 and 36 and the scrapers will drop to the road. The forward scraper rests upon the central portion of the road and the rear scrapers engage the side portions of the road upon each side of the ruts formed by the wheels of vehicles. The forward scrapers will remove the surplus dirt from the central portion of the road and move the same toward the sides where it will be engaged by the rear scrapers. These rear scrapers will move the dirt into the wheel ruts and the heavy rollers which support the rear end portion of the scraping machine will pack the dirt into the ruts and thus cause the ruts to be filled. If the rollers were not provided with the concave ground-engaging faces, the dirt moved into the ruts would be forced out of the ruts, but by having the ground-engaging faces concave, the dirt is moved toward the central portion of the ruts and thus tightly packed in the ruts. By having the scrapers vertically adjustable, the scrapers may be independently adjusted according to the pitch of road bed and may be moved out of engagement with the road bed when it is desired to move the machine along the road without scraping the road. By having the clevises 24 adjustably connected with the hanger brackets, the incline of the beams 22 when in an operative position may be regulated. It will thus be seen that with this form of scraper, the entire surface of the road may be scraped and leveled and the wheel ruts upon both sides of the road filled in with one operation.

What is claimed is:

1. A road leveling machine comprising a supporting frame, a forward scraper carried by said frame for moving surplus material from the center of a road toward the sides thereof, rear scrapers carried by said frame and each including scraping blades positioned in spaced relation for gathering surplus dirt removed from the center of a road bed by said forward scraper and causing the same to pass between the scraping blades, and compressing rollers carried by said frame and passing over the dirt passing between the scraping blades of said rear scrapers to compress the same.

2. In a road leveling machine a supporting frame, a forward scraper carried by said frame and including a blade having its side edges extending in diverging relation toward the rear of the frame for moving dirt upon a road bed toward the sides of said frame, rear scrapers carried by said frame upon opposite sides of the forward scraper and each including scraping blades positioned in spaced relation for gathering dirt removed from a road bed by the forward scraper and causing the same to pass between the blades of said rear scrapers, and compressing rollers carried by said frame for passing over material passing between the scraping blades of said rear scrapers to compress the same in a rut formed in a road.

3. In a road leveling machine a frame, a forward scraper carried by said frame and positioned in substantially the transverse center of the frame and having its scraping blade provided with diverging road-engaging edges for moving surplus material from the central portion of a road toward the sides thereof, rear scrapers carried by said frame and positioned adjacent the sides thereof, each including blades positioned in spaced relation with their road-engaging edges extending in diverging relation toward the front of the machine and positioned to gather the material scraped from the central portion of a road by said forward scraper and cause the material to pass between the scraping blades of said rear scrapers and into ruts formed in a road, and compressing rollers carried by said frame and positioned to travel over the material passing between the blades of said rear scrapers to compress the material into ruts formed by vehicle wheels in a road.

In testimony whereof I affix my signature in presence of two witnesses.

FRANCIS M. SETTLE.

Witnesses:
J. A. LAWRENCE,
B. B. PRIM.

Copies of this patent may be obtained for five cents each, by addressing the "Commissioner of Patents, Washington, D. C."